US007014500B2

(12) United States Patent
Belesimo

(10) Patent No.: US 7,014,500 B2
(45) Date of Patent: Mar. 21, 2006

(54) TESTING ASSEMBLY AND METHOD FOR IDENTIFYING NETWORK CIRCUITS

(76) Inventor: Adam Belesimo, 155 Scenery La., Johnston, RI (US) 02919

( * ) Notice: Subject to any disclaimer, the term of this patent is extended or adjusted under 35 U.S.C. 154(b) by 733 days.

(21) Appl. No.: 10/123,447

(22) Filed: Apr. 16, 2002

(65) Prior Publication Data

US 2003/0073343 A1  Apr. 17, 2003

Related U.S. Application Data

(60) Provisional application No. 60/329,728, filed on Oct. 16, 2001.

(51) Int. Cl.
*H01R 3/00* (2006.01)
(52) U.S. Cl. ...................................... 439/489
(58) Field of Classification Search ................ 439/489, 439/490, 488, 491; 324/66, 508, 556; 340/825.49, 340/687; 379/26.01; 702/183, 188
See application file for complete search history.

(56) References Cited

U.S. PATENT DOCUMENTS

| | | | |
|---|---|---|---|
| 3,840,801 | A | 10/1974 | Kellogg et al. |
| 3,931,574 | A | 1/1976 | Curtis, Jr. et al. |
| 4,019,128 | A | 4/1977 | Chebowski |
| 4,578,636 | A | 3/1986 | Bakke et al. |
| 4,596,904 | A | 6/1986 | Messenger |
| 4,626,633 | A | 12/1986 | Ruehl et al. |
| 5,185,570 | A | 2/1993 | Fitzpatrick |
| 5,428,294 | A | 6/1995 | Teel, Jr. |
| 5,602,750 | A | 2/1997 | Severt et al. |
| 5,604,439 | A | 2/1997 | Walkington et al. |
| 5,704,802 | A * | 1/1998 | Loudermilk ................ 439/490 |
| 5,739,694 | A | 4/1998 | Grochulski |
| 5,847,557 | A * | 12/1998 | Fincher et al. ................ 324/66 |
| 6,172,508 | B1 | 1/2001 | Nutt |
| 6,219,039 | B1 | 4/2001 | Chang et al. |

* cited by examiner

*Primary Examiner*—Alexander Gilman
(74) *Attorney, Agent, or Firm*—Barlow, Josephs & Holmes, Ltd.

(57) ABSTRACT

An improved method and apparatus for identifying individual wires that are connected between a network patch panel and a remote wall jacks is provided. A permanent LED lamp is installed adjacent to each jack in a computer network patch panel that is electrically connected to two terminals of each of the patch jacks. A handset component that produces direct current voltage is plugged into a remote wall jack to be tested, an electrical circuit is completed using the permanent network cabling thereby energizing the LED indicator lamp at the patch panel, providing positive visual confirmation of the patch panel location that corresponds to the wall jack location. The method of the present invention provides for one worker to remain at the patch panel location, as a second worker, using the handset component of the present invention, plugs the device into a wall plug in a remote location, which lights the corresponding LED on the patch panel. The worker at the patch panel communicates the circuit that was illuminated to the worker at the remote location. Thus, the correct wire for that location on the patch panel is instantly identified, and can be labeled by the remote worker.

12 Claims, 2 Drawing Sheets

TESTING ASSEMBLY AND METHOD FOR IDENTIFYING NETWORK CIRCUITS

PRIORITY CLAIM TO PREVIOUSLY FILED APPLICATION

This application claims priority to previously filed provisional patent application No. 60/329,728, filed Oct. 16, 2001.

BACKGROUND OF THE INVENTION

The present invention relates to a device and method for sorting and identifying electrical conductors, more particularly, the present invention relates to an improved method and apparatus for identifying individual wires or circuits from a plurality of wires or circuits extending between two remotely spaced locations.

It is often necessary to identify individual wires or circuits that extend between two locations to match the two ends of the wire to one another. In the computer networking industry, a cable, typically containing four pairs of wires is used for each computer network connection between a distribution frame in a computer distribution location and the computer workstation. The distribution frame is typically called the "patch panel", and it may contain hundreds, or even thousands of individual network circuits. Factories, ships and aircraft also have many individual wires crowded into tight bundles, each carrying power and signals, between different locations. Although the present invention is primarily directed toward solving a problem of the computer networking industry, the apparatus and method of the present invention has applicability to any system wherein large numbers of wires between spaced locations must be identified. In this application, the term "wire", unless otherwise stated or shown by the context, will also refer to a complete circuit, such as a Category V (CAT-V) cable used in computer networking systems.

The most commonly used prior art method for identifying the corresponding ends of such wires requires two workers. One worker is stationed at the patch panel, where one end of the wire is terminated, and the other worker is stationed at the remote location to be identified. In this context, "identify" means to determine which of the many wires connected to the patch panel corresponds to the same wire connected to the terminal jack at the remote location. The worker at the remote location, using a tone generating apparatus, applies a test tone to the terminal jack, which enters the wires connected there. Once the tone generator is connected, the worker at the patch panel sequentially scans each of the terminations at the patch panel until the energized conductor is found. The energized conductor, now identified as corresponding to the particular remote location, is then labeled. This process repeated until all of the network wires are identified. This process can take days or even weeks to complete in large network cabling installations.

The difficulty that arises with this prior art method is that this process is quite time consuming and involves a great deal of trial and error. The technician must hold the testing receiver adjacent to each of the cables that are connected to the back of the patch panel. Often this must be done in a small area that does not provide easy service access. In addition, since these areas are generally small, the cables in question are quite close to one another making it more difficult for the technician to differentiate and isolate the cable carrying the tone from all of the other cables. Further, if the cables are heavily shielded or there is a great deal of background noise it can be difficult to identify the tone carrying cable. Finally, this method is also non-permanent, meaning that if additional network circuits are added or if a number of wires are removed from the patch panel and re-terminated the process must be repeated to identify the new circuits.

Other methods that which can rapidly identify a wire connection location use permanently connected or built-in devices that maintain a matrix of pre-identified wires in a random-access memory chip that is installed in the patch panel device itself. Such devices however, are expensive to manufacture, and require the design and installation of a great deal of circuitry within the patch panel itself. In any case, what is needed is a permanently installed method for identifying wires that is inexpensive, fast, and simple to use.

SUMMARY OF THE INVENTION

In this regard, the present invention provides an improved method and apparatus for identifying individual wires that connected between spaced locations. The method relies one end of the wire to be connected to a patch panel manufactured in accordance with the present invention and the other end of the wire to be terminated with a jack connector means that can be rapidly inserted and removed by hand. Such jacks are typical in computer network installations, which commonly accept the industry-standard RJ-11 or RJ-45 type plugs.

In accordance with the present invention, the first component requires that an LED lamp be installed adjacent to each of the patch jacks on the faceplate of a network patch panel. The two electrical leads of the LED lamp are electrically connected to two terminals on the patch panel circuit board that correspond to two specific and identifiable terminals of each of the patch jacks in the patch panel. In the preferred embodiment, an LED would have one lead connected to the terminal that corresponds to conductor 7 of the cable and the other lead connected to the terminal that corresponds to conductor 8. While conductors 7 and 8 are specifically identified for the purpose of this description, it should not be viewed as a limitation as any two conductors within the cabling network can be employed for the operation of the present invention. The installation of indicator lamps for the present invention is done as part of the manufacturing process of the patch panel. The patch panel circuit boards are manufactured to include the LED indicator lamp at the factory and shipped to the user in "plug and play" fashion ready for integration into a network system and compatible with the testing and identification system of the present invention.

The second component of the present invention is a handset component that roughly correlates to the signal generator of the prior art. The handset unit is a power pack that contains batteries and any other required circuitry to produce direct current voltage in a range that is compatible with the LED indicator lamps that are installed in the patch panel equipment. The handset also has a wire lead with a RJ-45 or RJ-11 (Male and Female) jack on the terminal end. The positive and negative terminals of the DC power source are wired so as to be connected to the numbered and identified wiring locations corresponding the terminals onto which the LED leads are mounted in the patch panel, terminals 7 and 8 in the preferred embodiment. When the handset component is plugged into the wall jack to be tested, an electrical circuit is completed using the permanent network cabling using conductors 7 and 8. The positive DC current flows into the wall jack along one conductor, through the LED at the patch panel end and returns down the other conductor to complete the circuit. When energized the LED indicator lamp at the patch panel illuminates immediately providing positive visual confirmation of the patch panel location that corresponds to the wall jack location in question.

The testing system of the present invention can be configured to be employed with a variety of network environments as the concept is not limited to use in a 10/100 base T (Ethernet), Token Ring, FDDI or ATM environment and could be used with many types of cabling, Coax, Fiber or Category 1–7 cabling, without departing from the disclosure provided herein.

In accordance with the method of the present invention, one worker remains stationed at the patch panel location. A second worker applies a voltage, using the handset component of the present invention, to the plug in a remote location, which lights the corresponding LED on the patch panel, and only that LED. The worker at the patch panel communicates (usually by two-way radio) the information regarding the circuit that was illuminated to the worker at the remote location. Thus, the correct wire for that location on the patch panel is instantly identified, and can be labeled by the remote worker. The process in the present invention proceeds as fast as the remote worker can move from remote location to remote location. Furthermore, because of the ease with which the tested wiring can be identified, more than one worker can apply the test voltage to the remote ends of different wires at the same time, so long as all of the remote workers coordinate their efforts with the worker at the patch panel.

Accordingly, one of the objects of the instant invention is to provide a testing apparatus that provides positive visual identification of the wires connected to a network termination panel. Another object of the present invention is to provide an apparatus that is a permanent component of the network termination device thus eliminating the need to employ an additional signal-locating device when testing the wires that are connected to the network. Yet another object of the present invention is to provide a simple method for positively and visually identifying circuits in a cabling network that provides for improved speed and ease of identification as compared to the prior art.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
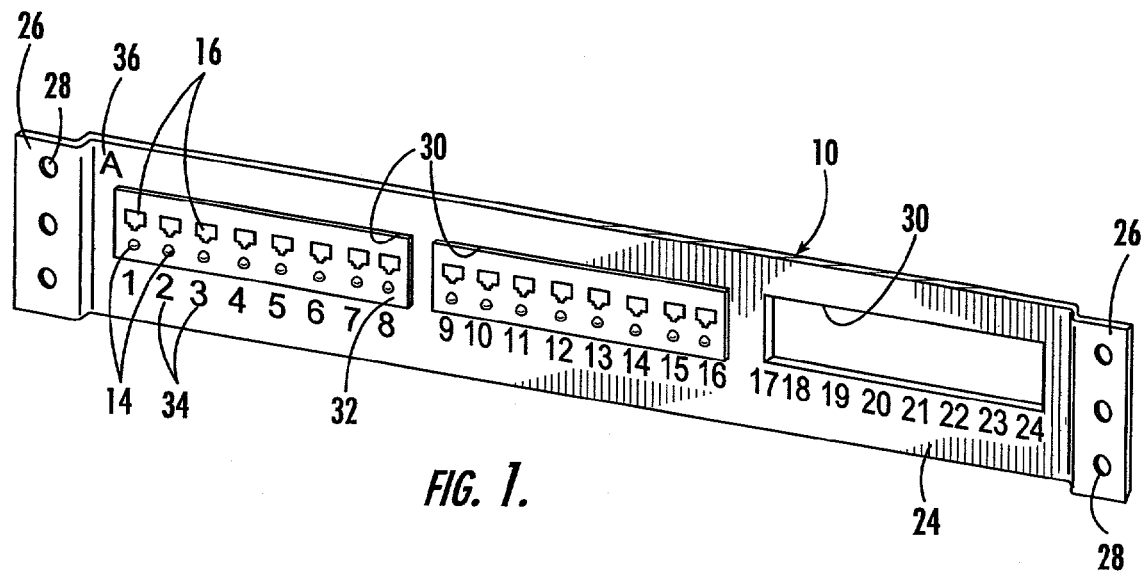
FIG. 1 is a perspective view of a computer network termination assembly of the present invention.

Referring now to the drawings, the cabling network testing apparatus of the present invention is illustrated in FIGS. 1–4. As will hereinafter be more fully described, the present invention includes testing apparatus for identifying particular cables in a cabling network that includes a network patch panel 10 and several remote wall jack 12 locations. The present invention provides for indicator lamps 14 that are installed in the patch panel device 10 adjacent to each of the patch jacks 16 installed therein to provide positive visual identification of the particular patch jack 16 that corresponds to the remote wall jack 12 location when a test voltage is applied at the remote location. As will be described, the apparatus and method of the present invention provide a simple cable identification system that can be operated more quickly and simply than the methods and apparatuses in the prior art.

The present invention generally includes two components, a patch panel component 10 and a signal generator component 18. The patch panel component 10 is specially manufactured in accordance with the present invention to include an indicator lamp 14 that is adjacent to each patch jack 16 location on the patch panel 10. The indicator lamp 14 is electrically connected to the patch jack 16 as will be further described below. Further, the patch panel component 10 is installed into a cabling network and a number of cables 20 containing conductive wires 22 are each connected to one of the patch jacks 16 located on the patch panel 10. The ends of the cables 20 that are not connected to the patch panel 10 are run to discrete locations remote from the patch panel 10 and the wires 22 in this end of the cable 20 are electrically connected to a wall jack 12.

For the purpose of this invention, the cabling network is generally described as a 10/100 base T (Ethernet) network and for illustration purposes, the termination jacks 12, 16 that are shown are RJ-45 type jacks. It should be understood, however, that the present invention is not limited to only Ethernet applications. The present invention can be employed with any type of cabling network that employs cable with at least one pair of conductive wires therein. It can therefore be seen that the present invention can also be applied in Token Ring, FDDI or ATM environments and can be used with many types of cabling such as coaxial, fiber optic or Category 1–7, without departing from the disclosure provided herein.

Turning to FIG. 1, the patch panel component 10 of the present invention is shown. The patch panel component 10 is manufactured to be a modular component for implementation into existing network cabling environments. To this extent, the patch panel 10 includes an outer support frame 24 with mounting tabs 26 on either end that have mounting holes 28 therein to allow the patch panel 10 to be mounted to a standard modular network rack system (not shown). Further, the frame 24 has rectangular cutouts 30 therein to receive modular frames 32 having patch jacks 16 that are compatible with the desired networking environment mounted therein. Typically, these modules 32 each include eight individual patch jacks 16 arranged in a single row. Further, the frame 24 includes numbers 34 that are aligned below each of the patch jacks 16 to provide a unique identification number to each of the jacks 16 installed in a patch panel 10. Therefore, a typical patch panel would include three modules 32 of eight patch jacks 16, the first module being identified by numbers 34 1–8, the second module 32 being numbered 9–16 and the third module 32 being numbered 17–24. Further, if the networking system employs more than one patch panel 10, each patch panel 10 would receive an identifying code 36 such as a number of a letter. For example, if a system used three patch panels 10, they may be identified as A, B and C. The patch jack 16 that was in the fourth place in the second module 32 in the first patch panel 10 is therefore identified as patch jack A-12.

Figure 2:
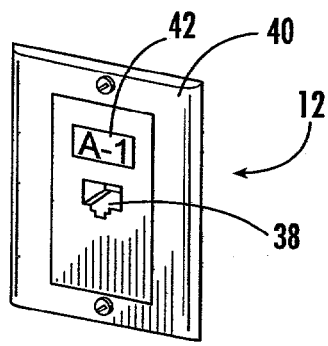
FIG. 2 is a perspective view of a remote network jack thereof.

Turning to FIG. 2, a typical remote wall jack 12 is shown. The wall jack 12 is provided with a female RJ-45 type jack 38 into which a patch cord that leads from the remote network device (not shown) is inserted during normal network operation. The wall jack 12 has a finish trim plate 40 that is installed after the jack 38 is connected to the cabling network as will be further described below. The wall jack 12 also includes a place for an identification tag 42 to be inserted, whereby the number 34, corresponding to the location in the patch panel 10 where the cable 20 from wall jack 12 is connected, is placed after it is identified using the present invention.

Figure 3:
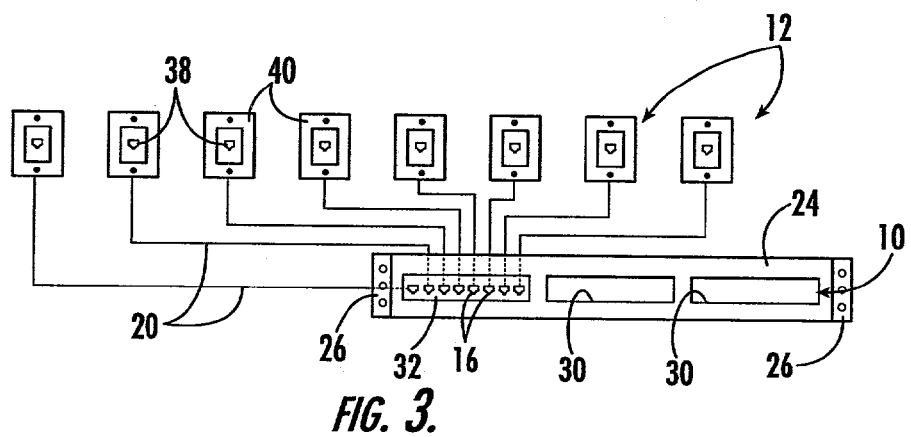
FIG. 3 is a schematic view of a network cabling installation.

FIG. 3 schematically illustrates a cabling network having eight remote wall jacks 12 connected to eight patch jacks 16 in a module 32 installed in a patch panel 10. The remote wall jacks 12 are each connected to a single patch jack 16 in the patch panel 10 using a length of cable 20. For the purpose of this description, the cable 20 will be a Category 5 (CATV) cable that includes four pairs of conductive wires 22. Each of the conductive wires 22 within the cable 20 is assigned a number 1 through 8 for identification purposes and to maintain uniformity throughout the cabling network. At one end, each of the eight conductive wires 22 in the cable 20 is electrically connected to individual contact pins 44 located in the patch jack 16 at the patch panel 10. At the remote end, the eight conductive wires 22 are electrically connected contact pins 44 located in the remote wall jack 12 thus providing electrical conductivity between each of the contact pins 1 through 8 in the wall jack 12 to each of the contact pins 1 through 8 in the patch jack 16 respectively using the conductive wires 22 in the cable 20.

Figure 4:
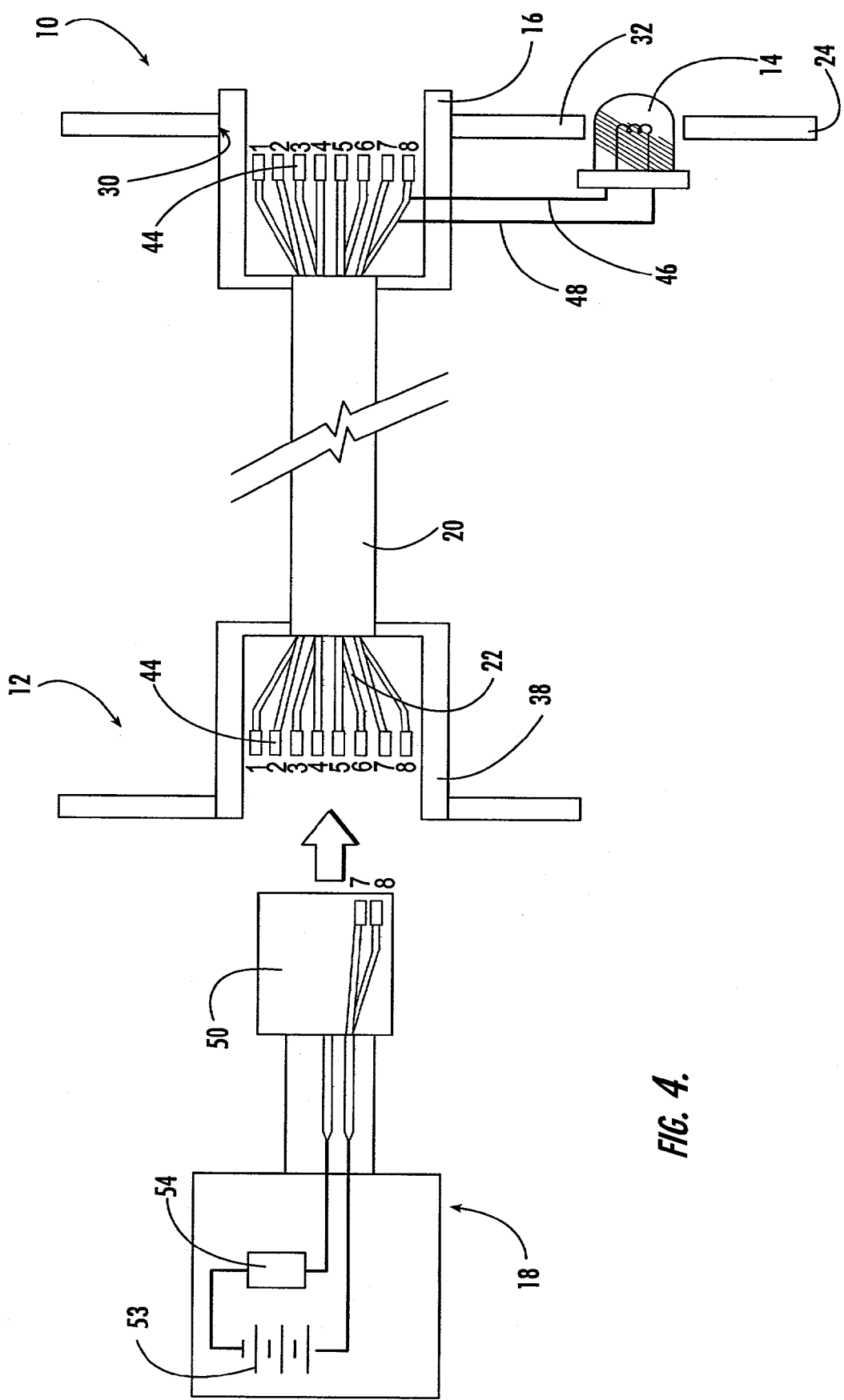
FIG. 4 is a schematic view of the signal generator of the present invention in relation to a network cabling installation.

A permanently installed indicator lamp 14 for use in the present invention can be best seen in FIGS. 1 and 4. A single indicator lamp 14 is installed into the face of the patch panel 10 adjacent to each of the patch jacks 16 mounted therein. In the preferred embodiment, the indicator lamp 14 is a light-emitting diode (LED) however a conventional electric lamp would also be within the scope of the present invention. One electrical lead 46 of the indicator lamp 14 is electrically connected to one of the contact pins 44 in the patch jack 16 and is therefore also in electrical communication with one of the electrical wires 22 in the cable 20 and the other electrical lead 48 of the indicator lamp 14 is electrically connected to another contact pin 44 in the patch jack 16 and is in communication with the electrical wire 22 connected thereto. In the preferred embodiment, the two electrical leads 46, 48 of the LED are connected to contact pins 7 and 8 respectively.

The signal generator component 18 of the present invention is schematically shown in FIG. 4. The signal generator 18 includes a test plug 50 that is designed to mate with the remote wall jack 39 in the network environment being tested. In the preferred embodiment, the test plug 50 is a male RJ-45 type plug. The remote wall jack 38 receives the test plug 50 during the testing operation of the present invention. The test plug 50 is electrically connected to a DC voltage source such as a battery 52 located in the signal generator component 18. One pole of the battery is connected to terminal 7 in the plug 50 and the other pole is connected to terminal 8 in the plug 50. When the plug 50 is installed in a remote wall jack 38, an electrical circuit is completed between the signal generator 18 and the indicator lamp 14 at the patch panel 10 using conductive wires 22 numbered 7 and 8. The polarity of the battery 50 is determined so that the indicator lamp 14 at the patch panel 10 corresponding to the cable 20 being tested is forward biased and will light when the signal from the signal generator 18 is applied to the remote wall jack 38. When the conductive wires 22 are energized with a voltage exceeding the forward voltage drop of the indicator lamp 14, and of the proper polarity, the indicator lamp 14 will light. It is not important to which of conductor wires 22 numbered 7 or 8 the anode or cathode of the indicator lamp 14 is attached, so long as all of the indicator lamps 14 and signal generators 18 are configured the same way. While all of the other patch jacks 16 on the patch panel 10 have respective indicator lamps 14, only the indicator lamp 14 adjacent to the patch jack 16 that is electrically connected to the remote wall jack 38 being tested will light, thereby immediately identifying the patch jack16 that corresponds the remote wall jack 12. Additionally, voltage or current limiting circuitry 54 may be included within the signal generator 18 if necessary, to limit the current through the indicator lamp 14.

Circuit testing using the method of the present invention begins by stationing a worker near the patch panel 10 to observe each of the patch panel jacks 16 and the respective indicator lamps 14 located adjacent thereto. A second worker then applies the test voltage to each remote jack 38 by plugging the signal generator 18 into the remote wall jack 38 that needs to be identified. The workers are in two-way communication, so that the worker at the remote jack 12 can identify the jack 38 to which he has applied the test voltage. The worker at the patch panel 10 can immediately locate the corresponding patch jack 16 in the patch panel 10, because the indicator lamp 14 adjacent thereto will illuminate. The worker at the patch panel 10 can then label the patch jack 16 and provide the identification number 34 as described above corresponding to the patch jack 16 location to the second worker, enabling him to label the remote wall jack 12 with a location number tag 42. The remote worker then proceeds to another location to test another remote jack 12. This process is repeated until all of the wires or circuits are identified.

Furthermore, as stated above, because of the ease with which the tested wiring can be identified, more than one remote worker can apply the test voltage to the remote wall jacks 12 using different signal generators 18 on the ends of different cables 20 at the same time. This is accomplished by coordinating the remote workers with one another and the worker at the patch panel 10 to provide sufficient communication and time delay between the application of the discreet remote signals.

It can be seen that the method described above can be used in other wiring systems provided that at least one pair of conductive wires is employed in the cabling of the cabling network. All that is required is that the terminal panel containing all the wires of the system have indicator lamps as described above. If this is the case, wires can be immediately identified by the application of a test voltage to the remote terminations of the cables, in the manner described above. Wires in factories, ships, aircraft and power plants could be identified using the above-described method.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. An apparatus for identifying at least one cable in a cabling system, said cable having a first end and a second end remote from said first end, said cable containing at least a first and second conductive wire, said apparatus comprising:
   a patch panel having at least one patch jack, said patch jack in electrical communication with said at least first and second conductive wires in said first end of said cable;
   at least one indicator lamp, permanently installed in said patch panel adjacent to said patch jack, said indicator lamp having a first electrical lead in electrical communication with said first conductive wire and a second electrical lead in electrical communication with said second conductive wire;
   at least one wall jack in electrical communication with said at least first and second conductive wires in said second end of said at least one cable; and
   means for applying a test voltage to said at least one wall jack,
   whereby the applied test voltage at said at least one wall jack causes said indicator lamp adjacent to said patch jack to light, when the patch jack is electrically connected to the wall jack through said first and second conductive wires of said cable.

2. The apparatus of claim 1, wherein said lamp is a light-emitting diode.

3. The apparatus of claim 1, wherein said at least one patch jack further comprises a predetermined number of individual patch jacks and said at least one indicator lamp comprises a predetermined number of individual indicator lamps corresponding to said predetermined number of individual patch jacks,
   wherein said at least one wall jack comprises a predetermined number of individual wall jacks corresponding to said predetermined number of individual patch jacks, said individual wall jacks being located remotely from said patch jacks and being in respective corresponding electrical communication with said individual patch jacks.

4. The apparatus of claim 1, wherein said means for applying a test voltage includes a test plug for insertion into said at least one wall jack, and a source of DC voltage electrically connected to said test plug.

5. The apparatus of claim 4, wherein said source of DC voltage is a battery.

6. The apparatus of claim 4, wherein said means for applying a test voltage further includes a current-limiting resistor electrically connected between said source of DC voltage and said test plug.

7. A method of identifying cables in a cabling system, each of said cables having wire pairs, said method comprising the steps of:
   a. providing a patch panel having permanently installed indicator lamps in electrical communication with said wiring pairs;
   b. providing jack locations remote from said patch panel;
   c. providing a means for sequentially applying a test voltage at each remote jack location to said wire pairs connected to said patch panel;
   d. applying said test voltage to each remote jack, one remote jack at a time, the remote jack being connected to one of a plurality of wire pairs connected to the patch panel, whereby said applied test voltage at the remote jack causes said indicator lamp at said patch panel jack to light, when the particular patch panel jack is electrically connected to the remote jack through a wire pair;
   e. recording at the patch panel jack location which indicator lamp lights when the test voltage is applied to a particular remote jack, so as to identify the patch panel jack and the remote jack by associating them with one another;
   f. communicating the fact of a successful identification to a worker at the remote location;
   g. choosing a new remote jack to test; and
   h. repeating steps "d" through "g" above until all wire pairs desired to be tested have been identified.

8. The method of claim 7, wherein said indicator lamp is a light-emitting diode.

9. The method of claim 7, wherein said means for applying a test voltage further includes a test plug for insertion into said remote wall jack and a source of DC voltage electrically connected to said test plug.

10. The method of claim 8, wherein said source of DC voltage is a battery.

11. The method of claim 9, wherein said means for applying a test voltage further includes a current-limiting resistor electrically connected between said source of DC voltage and said test plug.

12. An cable termination device for use in a cabling system, said cable having a first end and a second end remote from said first end, said cable containing at least a first and second conductive wire, said device comprising:
   a patch panel having at least one patch jack, said patch jack in electrical communication with said at least first and second conductive wires in said first end of said cable; and
   at least one indicator lamp, permanently installed in said patch panel adjacent to said patch jack, said indicator lamp having a first electrical lead in electrical communication with said first conductive wire and a second electrical lead in electrical communication with said second conductive wire.

* * * * *